United States Patent
Wang et al.

(10) Patent No.: US 10,929,647 B2
(45) Date of Patent: Feb. 23, 2021

(54) FACE IDENTIFICATION CAMERA MODULE

(71) Applicant: ASIA VITAL COMPONENTS CO., LTD., New Taipei (TW)

(72) Inventors: Wei-Chuan Wang, New Taipei (TW); Xin-Lian Cheng, New Taipei (TW); Ting-Yu Lin, New Taipei (TW); Chih-Liang Yeh, New Taipei (TW)

(73) Assignee: ASIA VITAL COMPONENTS CO., LTD, New Taipei (TW)

( * ) Notice: Subject to any disclaimer, the term of this patent is extended or adjusted under 35 U.S.C. 154(b) by 179 days.

(21) Appl. No.: 15/494,554

(22) Filed: Apr. 24, 2017

(65) Prior Publication Data

US 2018/0307898 A1 Oct. 25, 2018

(51) Int. Cl.
*H04N 5/225* (2006.01)
*G06K 9/00* (2006.01)
*G06K 9/20* (2006.01)
*H04N 5/222* (2006.01)

(52) U.S. Cl.
CPC ..... *G06K 9/00275* (2013.01); *G06K 9/00221* (2013.01); *G06K 9/00234* (2013.01); *G06K 9/00597* (2013.01); *G06K 9/209* (2013.01); *H04N 5/2251* (2013.01); *H04N 5/222* (2013.01)

(58) Field of Classification Search
CPC .......................... H04N 5/2251; G06K 9/00275
USPC ....................................................... 348/373
See application file for complete search history.

(56) References Cited

U.S. PATENT DOCUMENTS

| | | | |
|---|---|---|---|
| 2008/0186701 A1* | 8/2008 | Omi | G06K 9/00604 362/231 |
| 2013/0033581 A1* | 2/2013 | Woo | H04N 5/2257 348/47 |
| 2014/0063302 A1* | 3/2014 | Shukla | H04N 5/2254 348/294 |
| 2015/0294464 A1* | 10/2015 | Kim | G06K 9/00597 382/117 |
| 2018/0063420 A1* | 3/2018 | Kang | G06K 9/00604 |

FOREIGN PATENT DOCUMENTS

| | | |
|---|---|---|
| CN | 201251678Y Y | 6/2009 |
| CN | 104599335 A | 5/2015 |
| CN | 105023005 A | 11/2015 |
| CN | 205320153 U | 6/2016 |
| TW | M486102 U | 9/2014 |

* cited by examiner

*Primary Examiner* — Joel W Fosselman
(74) *Attorney, Agent, or Firm* — Demian K. Jackson; Jackson IPG PLLC

(57) ABSTRACT

A face identification camera module includes a circuit board, a camera device, at least one infrared LED light-emitting unit, an image processor and a connector. The respective units are disposed on a first side of the circuit board and electrically connected with the circuit board. The infrared LED light-emitting unit is disposed on left and right sides of the camera device. The infrared LED light-emitting unit serves to enhance the brightness, uniformity and contrast of the image so that a higher identification ratio can be achieved and a higher-definition face feature identification effect can be obtained by the camera device.

9 Claims, 3 Drawing Sheets

FACE IDENTIFICATION CAMERA MODULE

BACKGROUND OF THE INVENTION

1. Field of the Invention

The present invention relates generally to a face identification camera module, and more particularly to a face identification camera module, which is applicable to an electronic apparatus or a mobile device for face identification.

2. Description of the Related Art

A conventional camera device is mainly used to take photos or shoot a film and perform internet video. However, at the present time, the camera device has failed to fully satisfy the higher and higher human-machine interaction requirement of peoples. A user needs a simpler, more convenient and quicker human-machine interaction experience. Therefore, a human-machine interaction interface has been developed by those who are skilled in this field. Due to the limitation of hardware and imaging technique and the high cost for the camera device, the current face identification mechanism can be hardly widely applied to the display device. Therefore, the camera device cannot popularly interactively perform the face feature identification work.

The conventional face identification technique is mainly based on the visible light image. Such manner has some shortcomings that can be hardly overcome. When the environmental light changes, the identification effect will abruptly deteriorate. This cannot satisfy the requirement of the real system. For example, when taking a picture, in case a black-and-white face phenomenon takes place due to side light, it may be impossible to correctly identify the face.

Moreover, in the condition that the light is refracted and reflected to cause insufficient light source, the colored camera lens is apt to cause shadow on the five sense organs of the face and lead to the problem of unobvious face features. As a result, it often takes place that the face features cannot be identified or mis-identified.

SUMMARY OF THE INVENTION

It is therefore a primary object of the present invention to provide a face identification camera module, which can enhance the precision of face identification.

To achieve the above and other objects, the face identification camera module of the present invention includes a circuit board, a camera device, at least one infrared LED light-emitting unit, an image processor and a connector.

The circuit board has a first side and a second side oppositely disposed on upper and lower sides of the circuit board.

The camera device has an image sensation chip, a filter, a lens base seat and a lens. The components of the camera device are correspondingly stacked and assembled with each other. The image sensation chip is electrically connected with the circuit board.

The infrared LED light-emitting unit is disposed on the first side of the circuit board and electrically connected with the circuit board in adjacency to the camera device.

The image processor disposed on the first side of the circuit board and electrically connected with the circuit board.

The connector is disposed on the first side of the circuit board and electrically connected with the circuit board.

The face identification camera module of the present invention employs one single camera device (image receptor (CMOS)) and an image processor to implement the face identification function and lower the cost. The face imaging and colored image of the active infrared LED light-emitting unit (near infrared) are combined. Accordingly, the face identification can be performed without being affected by the environmental light so that a high-quality face image can be produced. Through the brightness, uniformity and contrast of the image, a higher identification ratio can be achieved and a higher-definition face feature identification effect can be obtained.

The face identification camera module is applied to and combined with a mobile device or a display device so as to lower the manufacturing cost and achieve the convenience in human-machine interaction.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
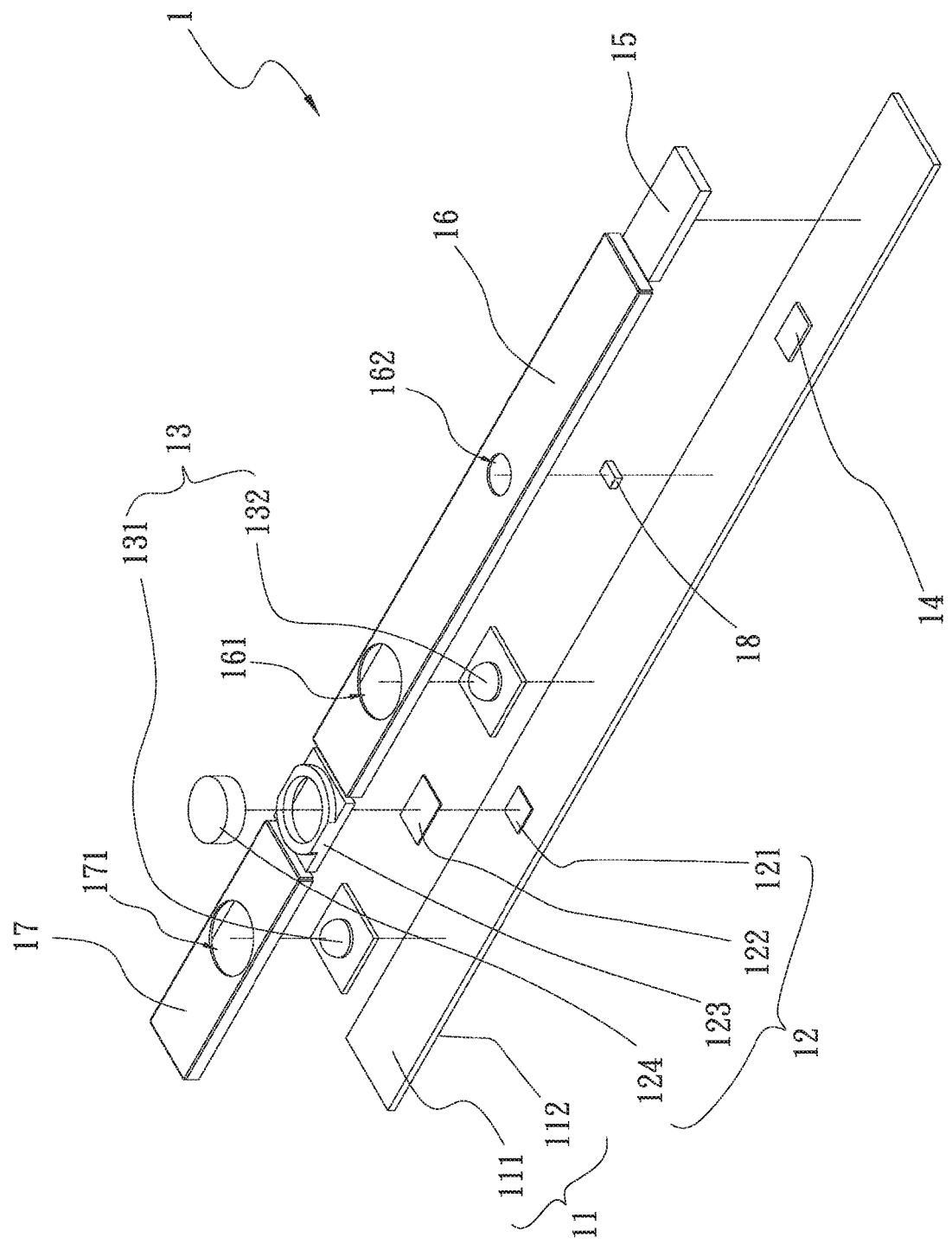
FIG. 1 is a perspective exploded view of a first embodiment of the face identification camera module of the present invention.
Figure 2:
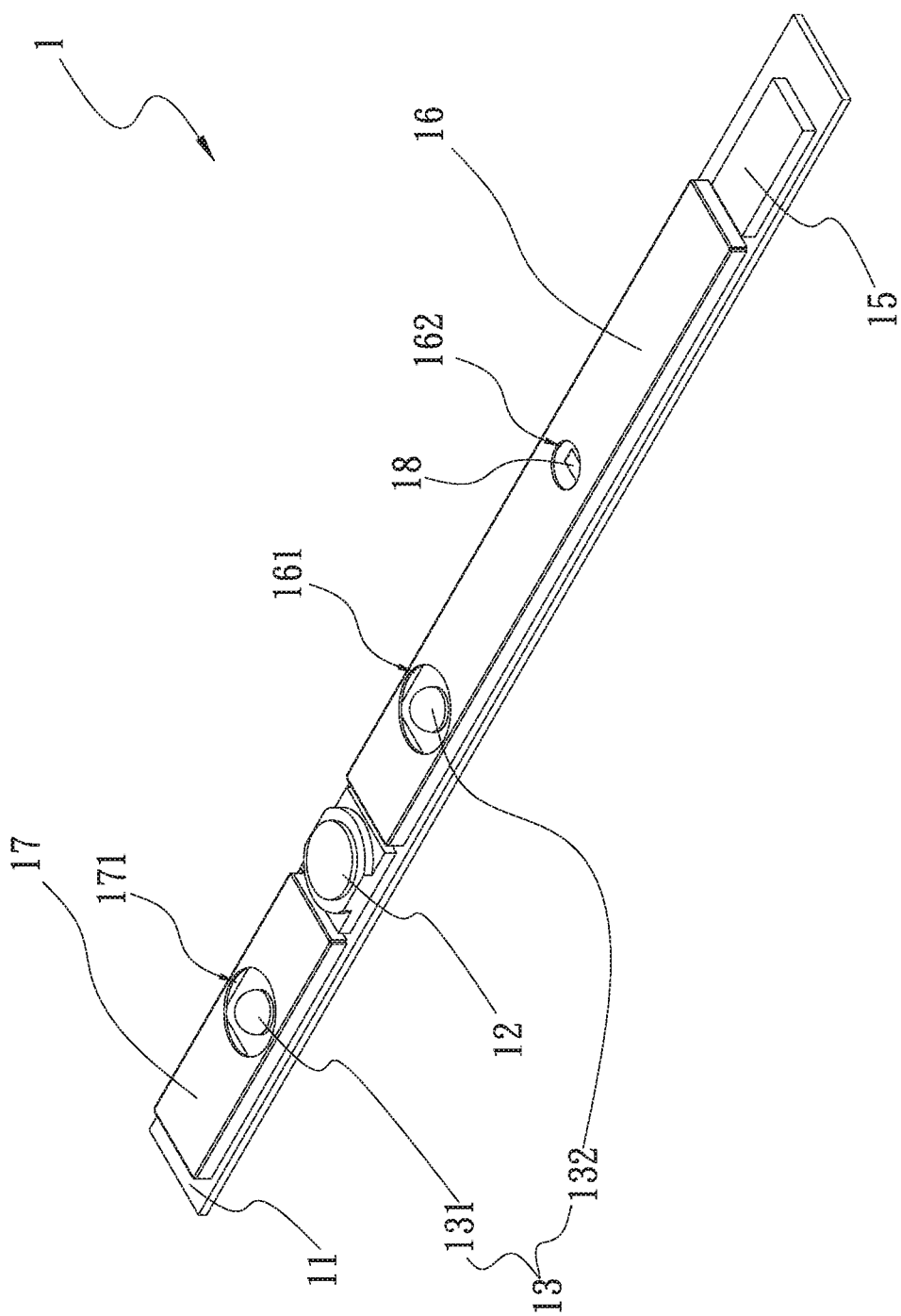
FIG. 2 is a perspective assembled view of the first embodiment of the face identification camera module of the present invention.
Figure 3:
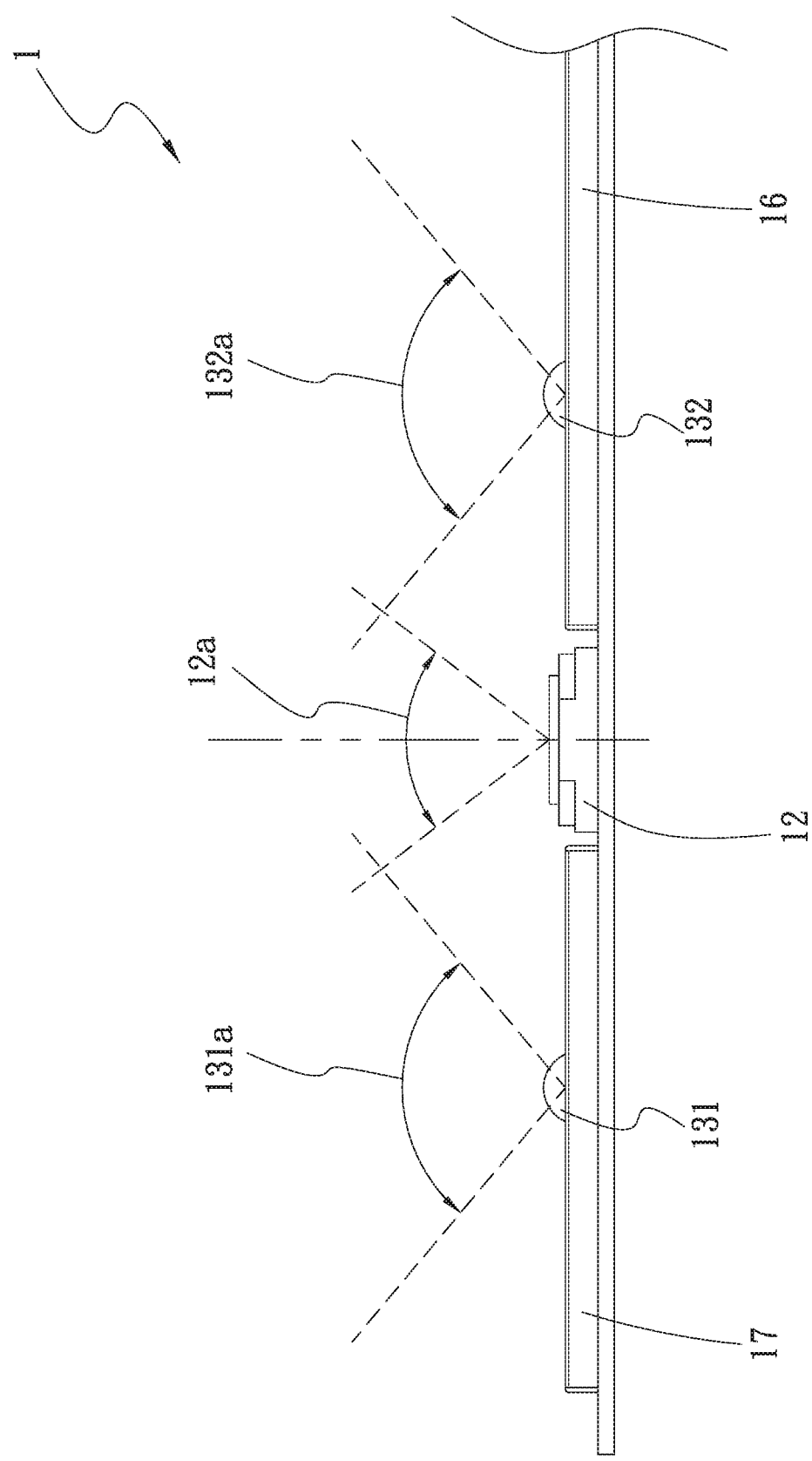
FIG. 3 is a side view of the first embodiment of the face identification camera module of the present invention, showing the operation thereof.

Please refer to FIGS. 1, 2 and 3. FIG. 1 is a perspective exploded view of a first embodiment of the face identification camera module. FIG. 2 is a perspective assembled view of the first embodiment of the face identification camera module. FIG. 3 is a side view of the first embodiment of the face identification camera module, showing the operation thereof. According to the first embodiment, the face identification camera module 1 of the present invention includes a circuit board 11, a camera device 12, at least one infrared LED light-emitting unit 13, an image processor 14 and a connector 15.

The circuit board 11 has a first side 111 and a second side 112 oppositely disposed on upper and lower sides of the circuit board 11. The circuit board 11 is a multilayered circuit board.

The camera device 12 has an image sensation chip 121, a filter 122, a lens base seat 123 and a lens 124. The components of the camera device 12 are correspondingly stacked and assembled with each other. The image sensation chip 121 is electrically connected with the circuit board 11. The total angle of visibility of the camera device 12 is ≥35 degrees.

The image sensation chip 121 is connected with the circuit board 11 by means of chip on board (COB) manufacturing process. The image sensation chip 121 is integrated, wired and disposed on the circuit board 11. The spectrum response range of the image sensation chip 121 of the camera device 12 is 400 nm~1100 nm.

The filter 122 is a dual-band narrow band-pass filter. The filter 122 is disposed in the camera device 12. The filter 122 permits the near infrared ray generated by the infrared LED light-emitting unit 13 to pass through, while filtering off the other environmental light. Therefore, the filter 122 serves to isolate the camera device 12 from the interference light to only receive the signal light, whereby the useful information is highlighted and the interference is minimized.

The infrared LED light-emitting unit 13 is disposed on the first side 111 of the circuit board 11 and electrically connected with the circuit board 11 in adjacency to the camera device 12. In this embodiment, the infrared LED light-emitting unit 13 is disposed on left and right sides of the camera device 12. The light source range of the infrared LED light-emitting unit 13 is ≥780 nm LED.

The image processor 14 is disposed on the first side 111 of the circuit board 11 and electrically connected with the circuit board 11. The connector 15 is disposed on the first side 111 of the circuit board 11 and electrically connected with the circuit board 11. The connector 15 serves as an interface for electrical connecting the circuit board 11 with other electronic apparatuses.

The infrared LED light-emitting unit 13 has a first infrared LED light-emitting component 131 and a second infrared LED light-emitting component 132. The first and second infrared LED light-emitting components 131, 132 are respectively disposed on left and right sides of the camera device 12. The first infrared LED light-emitting component 131 has a first projection angle 131a. The second infrared LED light-emitting component 132 has a second projection angle 132a. The camera device 12 has a reception angle 12a. The first and second projection angles 131a, 132a are larger than 90 degrees. The reception angle 12a of the camera device 12 ranges from 10 degrees to 180 degrees.

In addition, the face identification camera module 1 further has a first metal shield 16, a second metal shield 17 and an indicator lamp 18. The first and second metal shields 16, 17 are U-shaped hollow structures. The first and second metal shields 16, 17 are correspondingly connected with the circuit board 11. The first metal shield 16 has a first opening 161 and a second opening 162. The first and second openings 161, 162 are respectively formed through the first metal shield 16 in alignment with the second infrared LED light-emitting component 132 and the indicator lamp 18. The first metal shield 16 covers the image processor 14 and the second infrared LED light-emitting component 132 and the indicator lamp 18. In this embodiment, the second infrared LED light-emitting component 132 partially protrudes out of the first opening 161. In this embodiment, the indicator lamp 18 is, but not limited to, enclosed in the first metal shield 16 in alignment with the second opening 162. The second metal shield 17 has a third opening 171. The third opening 171 is formed through the second metal shield 17 in alignment with the first infrared LED light-emitting component 131. The second metal shield 17 correspondingly covers the first infrared LED light-emitting component 131. In this embodiment, the first infrared LED light-emitting component 131 partially protrudes, but not limited to, out of the third opening 171. The indicator lamp 18 is disposed on the first side 111 of the circuit board 11.

It is the primary object of the face identification camera module 1 of the present invention that when a user performs the face identification work, the first and second infrared LED light-emitting components 131, 132 of the infrared LED light-emitting unit 13 are used to fill light. The light is filled in such a manner that the face imaging and colored image of the active infrared LED light-emitting unit 13 (near infrared) are combined. Accordingly, the face identification can be performed without being affected by the environmental light so that a high-quality face image can be produced. Through the brightness, uniformity and contrast of the image, a higher identification ratio can be achieved and a higher-definition face feature identification effect can be obtained. The present invention supports the face identification work with the distance between the user and the camera device ranging from 1 cm to 100 cm and the face can be clearly identified within this range.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A face identification camera module comprising:
a circuit board having a first side and a second side oppositely disposed on upper and lower sides of the circuit board;
a camera device having an image sensation chip, a filter, a lens base seat, and a lens correspondingly stacked and assembled with each other, the image sensation chip being electrically connected with the circuit board;
a plurality of infrared light-emitting diode (LED) unit disposed on the first side of the circuit board and electrically connected with the circuit board in adjacency to the camera device, the filter passing infrared light generated by the infrared LED unit while filtering off other ambient light so as to isolate the camera device from interference light to only receive signal light so that useful information is highlighted and interference is minimized, the infrared LED unit having a first infrared LED component and a second infrared LED component, the first and second infrared LED components being respectively disposed on left and right sides of the camera device, the first infrared LED component having a first projection angle, the second infrared LED component having a second projection angle, the camera device having a reception angle, the first and second projection angles being larger than 90 degrees, the reception angle of the camera device ranging from 10 degrees to 180 degrees;
an image processor disposed on the first side of the circuit board and electrically connected with the circuit board; and
a connector disposed on the first side of the circuit board and electrically connected with the circuit board.

2. The face identification camera module as claimed in claim 1, further comprising a first metal shield and a second metal shield, the first and second metal shields being U-shaped hollow structures, the first and second metal shields being correspondingly connected with the circuit board, the first metal shield covering the image processor.

3. The face identification camera module as claimed in claim 1, further comprising an indicator lamp, the indicator lamp being disposed on the first side of the circuit board.

4. The face identification camera module as claimed in claim 1, wherein a light source range of the infrared LED unit is ≥780 nm.

5. The face identification camera module as claimed in claim 1, wherein an angle of visibility of the camera device is ≥35 degrees.

6. The face identification camera module as claimed in claim 1, wherein a spectrum response range of the camera device is 400 nm~1100 nm.

7. The face identification camera module as claimed in claim 1, wherein the filter is a dual-band narrow band-pass filter disposed in the camera device.

8. A face identification camera module comprising:
- a circuit board having a first side and a second side oppositely disposed on upper and lower sides of the circuit board;
- a camera device having an image sensation chip, a filter, a lens base seat, and a lens correspondingly stacked and assembled with each other, the image sensation chip being electrically connected with the circuit board;
- at least one infrared light-emitting diode (LED) unit disposed on the first side of the circuit board and electrically connected with the circuit board in adjacency to the camera device, the filter passing infrared light generated by the infrared LED unit while filtering off other ambient light so as to isolate the camera device from interference light to only receive signal light so that useful information is highlighted and interference is minimized;
- an image processor disposed on the first side of the circuit board and electrically connected with the circuit board; and
- a connector disposed on the first side of the circuit board and electrically connected with the circuit board;
  - a connector disposed on the first side of the circuit board and electrically connected with the circuit board; and
  - a first metal shield and a second metal shield, the first and second metal shields being U-shaped hollow structures, the first and second metal shields being correspondingly connected with the circuit board, the first metal shield covering the image processor.

9. A face identification camera module comprising:
- a circuit board having a first side and a second side oppositely disposed on upper and lower sides of the circuit board;
- a camera device having an image sensation chip, a filter, a lens base seat, and a lens correspondingly stacked and assembled with each other, the image sensation chip being electrically connected with the circuit board;
- at least one infrared light-emitting diode (LED) unit disposed on the first side of the circuit board and electrically connected with the circuit board in adjacency to the camera device, the filter passing infrared light generated by the infrared LED unit while filtering off other ambient light so as to isolate the camera device from interference light to only receive signal light so that useful information is highlighted and interference is minimized;
- an image processor disposed on the first side of the circuit board and electrically connected with the circuit board; and
- a connector disposed on the first side of the circuit board and electrically connected with the circuit board;
  - a connector disposed on the first side of the circuit board and electrically connected with the circuit board; and
  - an indicator lamp, the indicator lamp being disposed on the first side of the circuit board.

* * * * *